(No Model.)

W. H. HOOPES.
MANUFACTURE OF TOMBSTONES, &c., FROM PLASTIC MATERIAL.

No. 267,206. Patented Nov. 7, 1882.

Witnesses:
Jas. E. Hutchinson
H. C. Huntemann

Inventor.
Wm. H. Hoopes, by
Geo. S. Prindle, his Atty.

N. PETERS, Photo-Lithographer, Washington, D. C.

United States Patent Office.

WILLIAM H. HOOPES, OF BALTIMORE, MD., ASSIGNOR TO THE HOOPES ARTIFICIAL STONE, CEMENT AND PAINT COMPANY, OF SAME PLACE.

MANUFACTURE OF TOMBSTONES, &c., FROM PLASTIC MATERIAL.

SPECIFICATION forming part of Letters Patent No. 267,206, dated November 7, 1882.

Application filed August 24, 1882. (No model.)

*To all whom it may concern:*

Be it known that I, WILLIAM H. HOOPES, of Baltimore city, in the county of Baltimore, and in the State of Maryland, have invented certain new and useful Improvements in the Manufacture of Tombstones and other like Articles from Plastic Material; and I do hereby declare that the following is a full, clear, and exact description thereof, reference being had to the accompanying drawings, making a part of this specification, in which—

Figure 1:
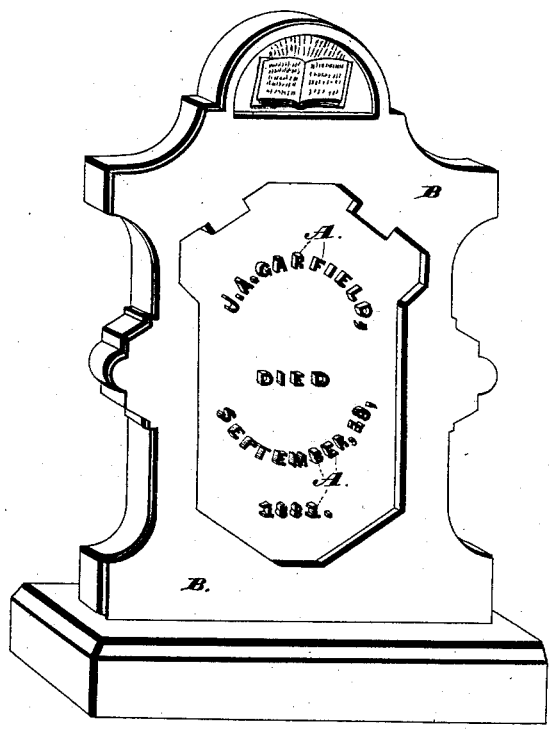
Figure 2:
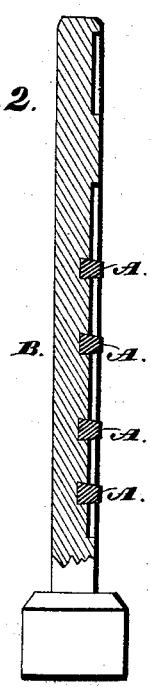

Figure 1 is a perspective view of a tablet constructed by my improved method, and Fig. 2 is a vertical section of the same.

Letters of like name and kind refer to like parts in each of the figures.

The design of my invention is to enable the inscription upon a tombstone, tablet, or other like article to be easily read in all kinds of lights; and to this end it consists in the means employed for producing conspicuous and permanent letters upon a body of plastic material, substantially as and for the purpose hereinafter specified.

In the use of my method the letters, A, which are to form the inscription are formed of any suitable vitreous material, and their surfaces colored to suit the taste and then glazed. The letters, A, are arranged within the face side of a mold in the relative positions they are to occupy, and plastic material B, preferably Portland cement, placed within and caused to fill the remainder of said mold and to closely embrace the sides and inner end of each letter. After said plastic material has become set the article may be removed from the mold, when it will be found that the contrast between the body and letters will be so great, not only on account of their difference in color, but because of the glazing of the latter and the absence of glazing of said body, as to render said letters very conspicuous, and to enable them to be easily read when those of ordinary material would be invisible. The letters may have their faces flush with the surface of the body, or they may be sunk below or caused to project beyond said surface, as desired, in either of which events they will be indistructible from the action of the elements.

Having thus fully set forth the nature and merits of my invention, what I claim as new is—

As a new article of manufacture, a tombstone, tablet, or other like article composed of a body of plastic material embracing and containing letters formed of vitreous material, substantially as and for the purpose specified.

In testimony that I claim the foregoing I have hereunto set my hand this 21st day of August, 1882.

WM. H. HOOPES.

Witnesses:
GEO. S. PRINDLE,
JOS. KAUSLER.